United States Patent
Frutschi

(10) Patent No.: US 6,223,523 B1
(45) Date of Patent: May 1, 2001

(54) METHOD OF OPERATING A POWER STATION PLANT

(75) Inventor: Hans Ulrich Frutschi, Riniken (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/116,933

(22) Filed: Jul. 17, 1998

(30) Foreign Application Priority Data

Jul. 25, 1997 (EP) .................................. 97810532

(51) Int. Cl.$^7$ ................. F02C 7/00; F02C 6/00; F02G 3/00

(52) U.S. Cl. ............ 60/39.05; 60/39.182; 60/39.53; 60/728

(58) Field of Search .............. 60/39.05, 39.182, 60/39.53, 39.55, 728

(56) References Cited

U.S. PATENT DOCUMENTS

| | | | |
|---|---|---|---|
| 4,569,195 | * | 2/1986 | Johnson .................... 60/39.55 |
| 4,932,204 | * | 6/1990 | Pavel et al. ................ 60/39.02 |
| 5,386,685 | * | 2/1995 | Frutschi ..................... 60/728 |
| 5,884,470 | * | 3/1999 | Frutschi ..................... 60/39.05 |
| 6,089,024 | * | 7/2000 | Hatanaka ................... 60/671 |

FOREIGN PATENT DOCUMENTS

| | | |
|---|---|---|
| 480535 | 12/1969 | (CH) . |
| 2138664 | 3/1973 | (DE) . |
| 3815993A1 | 11/1989 | (DE) . |
| 4237665A1 | 5/1994 | (DE) . |
| 0081996A2 | 6/1983 | (EP) . |
| 0516995A1 | 12/1992 | (EP) . |
| 2230864 | 12/1974 | (FR) . |
| 1085425 | 10/1967 | (GB) . |

* cited by examiner

Primary Examiner—Charles G. Freay
(74) Attorney, Agent, or Firm—Burns, Doane, Swecker & Mathis, L.L.P.

(57) ABSTRACT

In a method of operating a power station plant which essentially comprises a gas-turbine group and a steam circuit arranged downstream, a portion of the condensate collecting from this steam circuit is directed to an intercooler, which belongs to the compressor of the gas-turbine group and in which the condensate is heated up to form hot water. This hot water is then introduced directly or via a further heating-up means into the gas-turbine group at a suitable point.

8 Claims, 3 Drawing Sheets

METHOD OF OPERATING A POWER STATION PLANT

BACKGROUND OF THE INVENTION

1. Field of the Invention

The present invention relates to a method of operating a power-station plant according to the preamble of claims 1 and 2.

2. Discussion of Background

In a power station plant which comprises a gasturbine group, a waste-heat steam generator arranged downstream, and an adjoining steam circuit, it is advantageous to provide a supercritical steam process in the steam circuit in order to achieve a maximum efficiency.

CH-480 535 has disclosed such a circuit. In this circuit, for the purpose of optimum utilization of the waste heat of the gas-turbine group in the lower temperature range of the waste-heat steam generator, a mass flow of the circuit medium of the gas turbine is branched off and utilized recuperatively in the gas turbine. Both the gas-turbine process and the steam process have sequential combustion. However, in the case of modern gas turbines preferably of single-shaft design, this configuration leads to an undesirable complication with regard to construction.

In a plant which has been disclosed and is equipped with an intercooler in operative connection with the compressor unit, a large portion, or even the entire quantity, of the accumulating hot water is directed out of this intercooler into a mixing preheater belonging to the steam circuit. With this measure, excess heat, which causes some of the water to evaporate, develops in the mixing preheater. The steam which is thus produced can then be fed via a line holding the vacuum to a steam turbine in which work is performed. However, such an arrangement has the disadvantage that the large-volume flow path of the low-pressure part of the steam turbine has to be enlarged even further. The work gain of this steam quantity is relatively small; at most it could just be sufficient to compensate for the adverse effect of the intercooler on the efficiency of the power station plant.

SUMMARY OF THE INVENTION

Accordingly, one object of the invention, in a method of the type mentioned at the beginning, is to achieve a substantial increase in the efficiency with regard to output.

For this purpose, only a portion of the hot water from the intercooler is fed to the mixing preheater, while the other portion is fed directly or via a further heating-up means to the gas turbine at a suitable point, preferably upstream of the combustion chambers.

The essential advantage of the invention may be seen in the fact that the steam which is produced by this injection of hot water into the combustion chambers increases the output of at least one turbine of the gas-turbine group and thus directly increases the output delivered to the generator. In addition, this steam which is thus produced increases the exhaust-gas quantity, so that more steam is also generated in the waste-heat boiler. To this end, the feedwater quantity must of course be increased accordingly, with corresponding adaptation of the fuel feeds, so that the injected hot water can evaporate without any problem, and the steam which is thus produced is superheated to the nominal hot-gas temperatures.

It is certainly true that an increase in output can also be achieved by injection of cold water upstream of the combustion chamber of a gas turbine; however, an appreciable reduction in the efficiency is thus traded off, because the water must of course be preheated by fuel and evaporated, which is very unfavorable in terms of energy.

A further essential advantage of the invention may be seen in the fact that, in the case of gas turbines having sequential firing, only the hot water introduced into the first combustion chamber has to be evaporated by fuel and accordingly the steam has to be superheated. When the steam which is thus produced passes through the second combustion chamber, only reheat has to be supplied by fuel there, which is favorable in terms of energy.

In addition, the injection of hot water has a fuel-saving effect by virtue of the fact that the hot water of the intercooler, before its injection, can be heated up further in an economizer, which can still be readily accommodated from the thermodynamic point of view.

Advantageous and expedient developments of the achievement of the object according to the invention are defined in the further claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
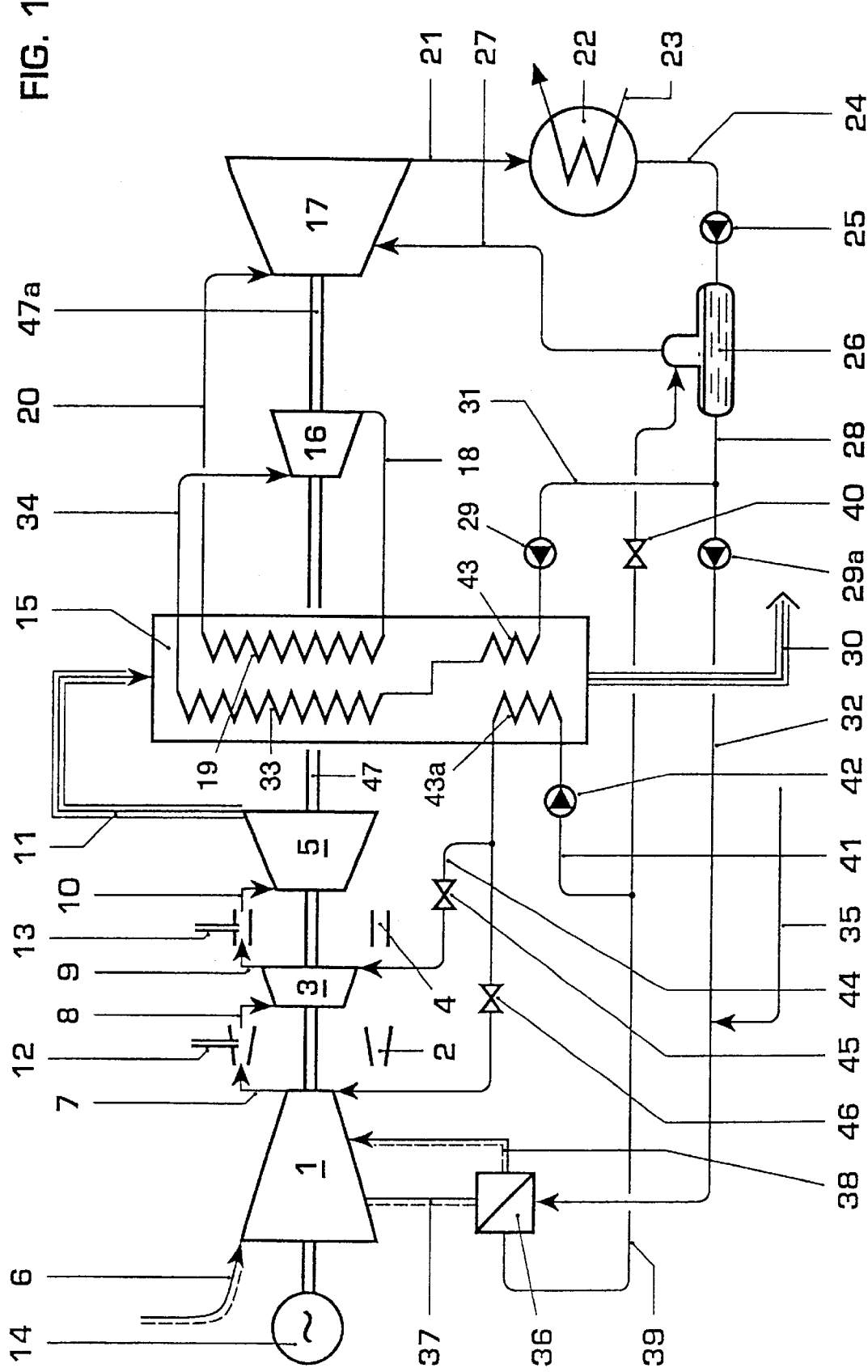
FIG. 1 shows a circuit of a power station plant.

Referring now to the drawings, wherein like reference numerals designate identical or corresponding parts throughout the several views, all the elements not required for the direct understanding of the invention have been omitted, and the direction of flow of the media is indicated by arrows, FIG. 1 shows a power station plant, which comprises a gas-turbine group, a waste-heat steam generator connected downstream of the gas-turbine group, and a steam circuit connected downstream of this waste-heat steam generator.

The present gas-turbine group is constructed for sequential combustion. The provision (not shown in FIG. 1) of the fuel necessary for operating the various combustion chambers may be effected, for example, by coal gasification interacting with the gas-turbine group. It is of course also possible to obtain the fuel used from a primary network. If a gaseous fuel for operating the gas-turbine group is supplied via a pipeline, the potential from the pressure and/or temperature difference between primary network and consumer network may be used for the requirements of the gas-turbine group or the circuit in general. The present gas-turbine group, which may also act as an autonomous unit, consists of a compressor 1, a first combustion chamber 2 arranged downstream of the compressor, a first turbine 3 arranged downstream of this combustion chamber 2, a second combustion chamber 4 arranged downstream of this turbine 3, and a second turbine 5 arranged downstream of this combustion chamber 4. The compressor 1 is equipped with an intercooler 36, in which a preheated condensate 32 serves as heat sink and is heated up to form hot water 39. Said fluid-flow machines 1, 3, 5 have a common rotor shaft 47. This rotor shaft is preferably mounted on two bearings (not shown in any more detail in the figure) which are preferably positioned on the head side of the compressor 1 and downstream of the second turbine 5. The intercooler will be dealt with in more detail further below. The air 6 which is drawn in is compressed in the compressor 1 and then flows as compressed air 7 into a casing (not shown in any more detail). Also accommodated in this casing is the first combustion chamber 2, which is preferably designed as a continuous annular combustion chamber. The compressed air 7 to the first combustion chamber 2 may of course be provided from an air accumulator system (not shown). On the head side, the annular combustion chamber 2 has a number of burners (not shown in any more detail) which are distributed over the periphery and are preferably designed as premix burners. Diffusion burners may also be used here per se. However, for reducing the pollutant emissions from this combustion, in particular as far as the NOx emissions are concerned, it is advantageous to provide an arrangement of premix burners according to EP-PS-0 321 809, the subject matter of the invention from said publication being an integral part of this description, as is the type of feeding described there for a fuel 12. As far as the arrangement of the premix burners in the peripheral direction of the annular combustion chamber 2 is concerned, such an arrangement may differ from the conventional configuration of identical burners if required, and premix burners of different sizes may be used instead. This is preferably done in such a way that a small premix burner of the same configuration is disposed in each case between two large premix burners. The size of the large premix burners, which have to fulfill the function of main burners, in relation to the small premix burners, which are the pilot burners of this combustion chamber, is established from case to case with regard to the burner air passing through them, that is, the compressed air 7 from the compressor 1. The pilot burners work as independent premix burners over the entire load range of the combustion chamber, the air coefficient remaining virtually constant. The main burners are switched on and off according to certain provisions specific to the plant. Since the pilot burners can be run on an ideal mixture over the entire load range, the NOx emissions are very low even at part load. In such a configuration, the encircling flow lines in the front region of the annular combustion chamber 2 come very close to the vortex centers of the pilot burners, so that an ignition per se is only possible with these pilot burners. During run-up, the fuel quantity which is fed via the pilot burners is increased until the pilot burners are modulated, i.e. until the full fuel quantity is available. The configuration is selected in such a way that this point corresponds to the respective load-shedding conditions of the gas-turbine group. The further power increase is then effected via the main burners. At the peak load of the gas-turbine group, the main burners are therefore also fully modulated. Since the configuration of "small", hot vortex centers, which is initiated by the pilot burners, between the "large", cooler vortex centers originating from the main burners turns out to be extremely unstable, very good burn-out with low CO and UHC emissions in addition to the NOx emissions is achieved even in the case of main burners operated on a lean mixture in the part-load range, i.e. the hot vortices of the pilot burners penetrate immediately into the small vortices of the main burners. The annular combustion chamber 2 may of course consist of a number of individual tubular combustion spaces which are likewise arranged in an inclined annular shape, sometimes also helically, around the rotor axis. This annular combustion chamber 2, irrespective of its design, is and may be arranged geometrically in such a way that it has virtually no effect on the rotor length. The hot gases 8 from this annular combustion chamber 2 are admitted to the first turbine 3 arranged directly downstream, the thermally expanding action of which on the hot gases is deliberately kept to a minimum, i.e. this turbine 3 will accordingly consist of no more than two rows of moving blades. In such a turbine 3 it will be necessary to provide pressure compensation at the end faces for the purpose of stabilizing the axial thrust. The hot gases 9 which are partly expanded in the turbine 3 and which flow directly into the second combustion chamber 4 are at a very high temperature for the reasons explained; for specific operational reasons the design is preferably to allow for a temperature which is certainly still around 1000° C. This second combustion chamber 4 essentially has the form of a continuous annular, axial or quasi-axial annular cylinder. This combustion chamber 4 may of course also consist of a number of axially, quasi-axially or helically arranged and self-contained combustion spaces. As far as the configuration of the annular combustion chamber 4 consisting of a single combustion space is concerned, a plurality of fuel lances (not shown in any more detail in the figure) are disposed in the peripheral and radial direction of this annular cylinder. This combustion chamber 4 has no burners: the combustion of a fuel 13 injected into the partly expanded hot gases 9 coming from the turbine 3 takes place here by self-ignition, if indeed the temperature level permits such a mode of operation. If the combustion chamber 4 is operated with a gaseous fuel, that is for example natural gas, the outlet temperature of the partly expanded hot gases 9 from the turbine 3 must still be very high, around 1000° C. as explained above, and this of course must also be the case during part-load operation, a factor which plays a causal role in the design of this turbine 3. In order to ensure the operational reliability and a high efficiency in the case of a combustion chamber designed for self-ignition, it is of the utmost importance that the flame front remains locally stable. For this purpose, a number of elements (not shown in any more detail) are provided in this combustion chamber 4 and are preferably disposed on the inner and outer walls in the peripheral direction and preferably positioned in the axial direction upstream of the fuel lances. The task of these elements is to generate vortices which induce a backflow zone similar to that in the premix burners already mentioned. Since this combustion chamber 4, on account of the axial arrangement and the overall length, is a high-velocity combustion chamber in which the average velocity of the working gases is greater than about 60 m/s, the vortex-generating elements must be designed to conform to the flow. On the inflow side, these elements are preferably to consist of a tetrahedral shape having inclined surfaces with respect to the inflow. The vortex-generating elements may be placed on either the outer surface and/or the inner surface. The vortex-generating elements may of course also be displaced axially relative to one another. The outflow-side surface of the vortex-generating elements is formed essentially radially, so that a backflow zone appears starting from this location. However, the self-ignition in the combustion chamber 4 must also continue to be assured in the transient load ranges as well as in the part-load range of the gas-turbine group, i.e. auxiliary measures must be provided which ensure the self-ignition in the combustion chamber 4 even if the temperature of the gases in the region of the injection of the fuel should vary. In order to ensure reliable self-ignition of the gaseous fuel injected into the combustion chamber 4, a small quantity of another fuel having a lower ignition temperature is added to this fuel. Fuel oil, for example, is very suitable here as auxiliary fuel.

The liquid auxiliary fuel, appropriately injected, performs the task of acting, so to speak, as a fuse and permits self-ignition in the combustion chamber 4 even if the partly expanded hot gases 9 from the first turbine 3 should be at a temperature below the desired optimum level of 1000° C. This measure of providing fuel oil for ensuring self ignition certainly always proves to be especially appropriate when the gas-turbine group is operated at greatly reduced load. Furthermore, this measure is a decisive factor in enabling the combustion chamber 4 to have a minimum axial length. The short overall length of the combustion chamber 4, the action of the vortex-generating elements for stabilizing the flame as well as the continual guarantee of self-ignition are accordingly responsible for the fact that the combustion is effected very quickly, and the dwell time of the fuel in the region of the hot flame front remains minimal. An effect resulting herefrom which is directly measurable from the combustion relates to the NOx emissions, which are minimized in such a way that they are now no longer relevant. Furthermore, this initial situation enables the location of the combustion to be clearly defined, which is reflected in optimized cooling of the structures of this combustion chamber 4. The hot gases 10 prepared in the combustion chamber 4 are then admitted to a second turbine 5 arranged downstream. The thermodynamic characteristics of the gas-turbine group may be designed in such a way that the exhaust gases 11 from the second turbine 5 still have enough thermal potential to operate a steam-generating stage, shown here with reference to a waste-heat steam generator 15, and steam circuit. As already pointed out in the description of the annular combustion chamber 2, this annular combustion chamber 2 is arranged geometrically in such a way that it has virtually no effect on the rotor length. Furthermore, it can be established that the second combustion chamber 4, which runs between the outflow plane of the first turbine 3 and the inflow plane of the second turbine 5, has a minimum length. Furthermore, since the expansion of the hot gases in the first turbine 3, for reasons explained, takes place over few rows, preferably over only 1 to 2 rows, of moving blades, a gas-turbine group whose rotor shaft 47 can be supported in a technically satisfactory manner on two bearings on account of its minimized length can be provided. The power output of the fluid-flow machines takes place via a generator 14 which is coupled on the compressor side and may also serve as a starting motor. After expansion in the turbine 5, the exhaust gases 11, which are still provided with a high thermal potential, flow through a waste-heat steam generator 15 in which steam is generated repeatedly by heat-exchange processes and then forms the working medium of the steam circuit arranged downstream. The thermally utilized exhaust gases then flow as flue gases 30 into the open.

The waste-heat steam generator 15 has a tube nest 19 for reheated steam, and this tube nest 19 admits intermediate-pressure steam 20 to a low-pressure turbine 17. Furthermore, this waste-heat steam generator 15 has a tube nest 33 in which high-pressure steam 34 for admission to a high-pressure steam turbine 16 is prepared, this steam being at about 250 bar. The steam 18 expanded from this high-pressure steam turbine 16 forms the medium for the tube nest 19 in which intermediate-pressure steam 20 for admission to a low-pressure steam turbine 17 is prepared. Both steam turbines 16, 17 are preferably mounted on one shaft 47a and are preferably coupled to the rotor shaft 47 of the gas-turbine group via a coupling (not shown). An autonomous unit of the steam group having a further generator is also possible. It is also possible to operate the high-pressure steam turbine 16 at increased rotational speed and to couple it via gearing or converter.

The steam 21 expanded in the low-pressure steam turbine 17 is condensed in a water- or air-cooled (23) condenser 22. By means of a condensate pump 25 acting downstream of this condenser 22, the condensate 24 is delivered into a feedwater tank and degasser 26, which is also known as a mixing preheater. The condensate 24 is preheated in it to about 60° C. by the feeding of hot water 39. A control member 40 meters the hot-water quantity in such a way that the steam just stagnates in the pressure-keeping line 27. The condensate 28 from the degasser 26 is split up and delivered further via corresponding feed pumps 29, 29a. A portion 31 of this condensate 28 forms the quantity which is directed through an economizer 43 acting upstream of the tube nest for superheated high-pressure steam 33, this quantity corresponding to the quantity of the expanded steam 21 from the low-pressure steam turbine 17. The other portion of the condensate 28 flows via a line 32 to an intercooler 36 in operative connection with the compressor 1. By heat emission of the partly compressed air 37 in the intercooler 36, the condensate 32 is turned into high-pressure hot water 39, in the course of which the cooled, partly compressed air 38 flows back into the compressor 1 for further pressure treatment. Approximately half the hot water 39 from the intercooler 36 is branched off before flowing into the degasser 26 and is directed by means of a feed pump 42 via a further economizer 43a in the waste-heat steam generator 15 and then, heated further up to just before the boiling point, is directed as hot water 44 into the gas-turbine group at a suitable point. It can be seen in the figure that this hot water 44 can be injected in parallel into various units of the gas-turbine group via various control members 45, 46, in which case flow paths in series are also possible for the introduction of this hot water 44. The quantity of this hot water 39 consumed by injection is replaced by a corresponding quantity of make-up water 35 upstream of the intercooler 36. If the intercooler 36 is optimally positioned thermodynamically, the preheating in the intercooler 36 is brought to about 130° C. at an overall pressure ratio of about 30:1. In the economizer 43a already mentioned, the make-up water 35 is heated further up to about 200° C. Under these conditions, approximately just enough hot water 39 flows to the degasser 26 from the intercooler 36 for the preheating of the condensate 24 flowing in there to take place. During such a regulated balance, the steam quantity flowing through the pressure-keeping line 27 into the low-pressure steam turbine 17 therefore stagnates, provision hereby being made only for the stabilization of the vacuum in the mixing preheater 26. In operating conditions deviating from the design point, the mixing preheater 26 automatically gets preheating steam from the said steam turbine 17 or)delivers flash steam there.

Figure 2:
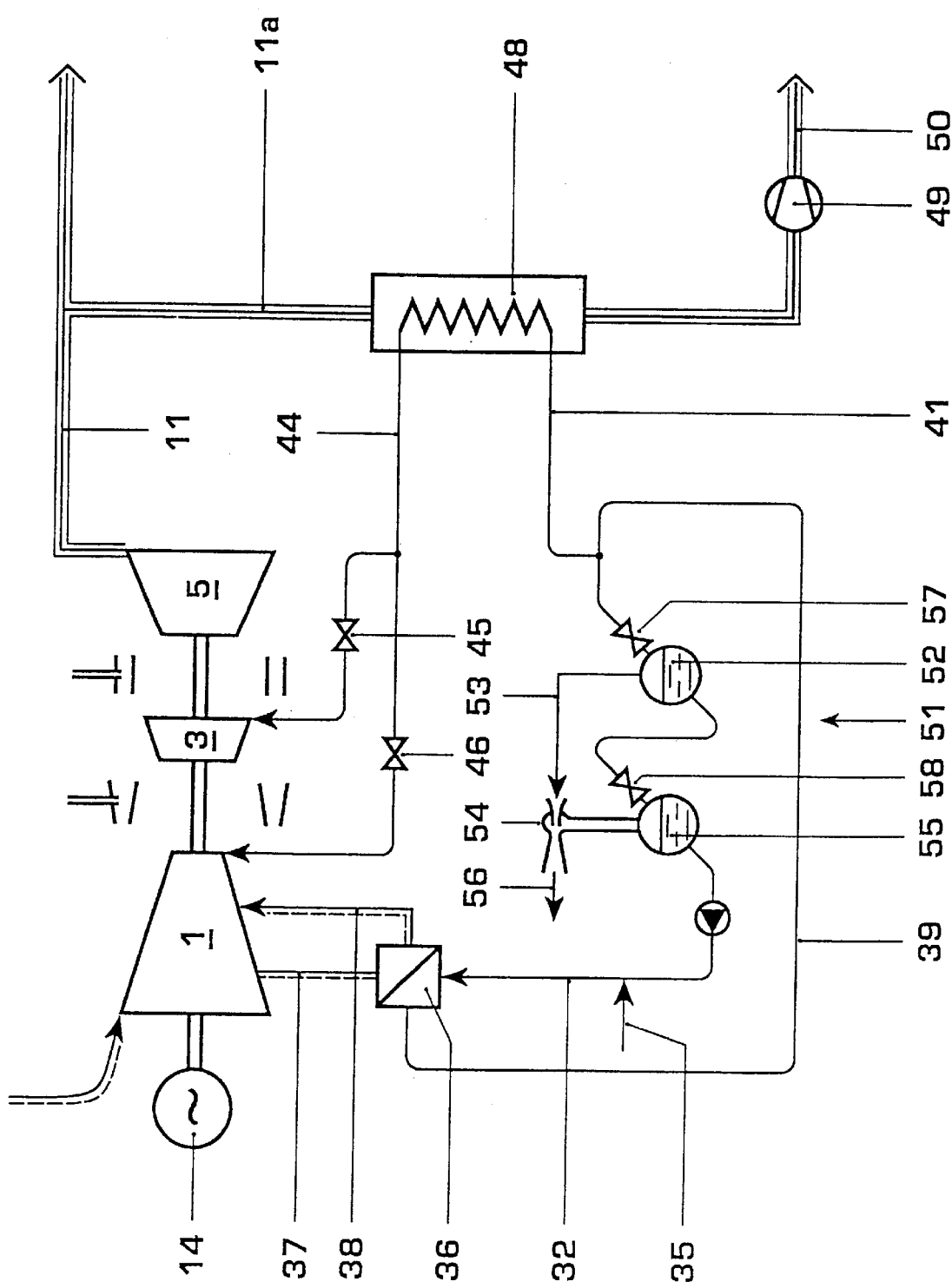
FIG. 2 shows a further circuit of a power station plant.

If the gas-turbine group works without a waste-heat boiler, that is, without a combined-cycle circuit according to FIG. 2, the mode of operation of the gas-turbine group with the intercooler 36 corresponds to that of the gas/steam combined-cycle plant. In place of the waste-heat steam generator, a heat exchanger 48 for the heating of the high-pressure hot water 39 from the intercooler 36 now comes into operation. Since, in this case too, usually only a portion 41 of the hot water 39 has to be heated in the heat exchanger 48, the latter is preferably placed in a secondary flow 11a of the exhaust-gas line 11, and the exhaust-gas quantity 11a required for the preheating is delivered and controlled via an induced-draft blower 49. The flue gases 50 then continue to flow. Consequently, not all the exhaust-gas flow 11 has to be retained, which would be unfavorable in terms of energy. Since only a portion of the hot-water quantity is directed into the gas turbine via the line 44, the excess portion has to be fed to a heat sink or be utilized in another way. Here, a heat sink consists in the fact that an evaporation cascade 51 is provided. Its mode of operation is such that positive-pressure steam 53 is produced in a first flask 52 and this positive-pressure steam 53, via an ejector 54, evacuates a second flask 55 in which the water there is brought below 100° C., so that the cooling water 32 is obtained together with the make-up water 35. Not only the steam quantity 44 injected into the gas turbine but also the water leaving with the exhaust steam 56 of the ejector 54 must be replaced by the make-up water 35. Control members 57, 58 provide for the operation of the flasks 52, 55.

The amount of water consumed by the intercooler 36 of the compressor 1 and by the injection of a steam quantity 44 into the gas turbine for the additional output obtained is about the same as that consumed by an evaporative cooling tower of a modern power station of corresponding output.

Figure 3:
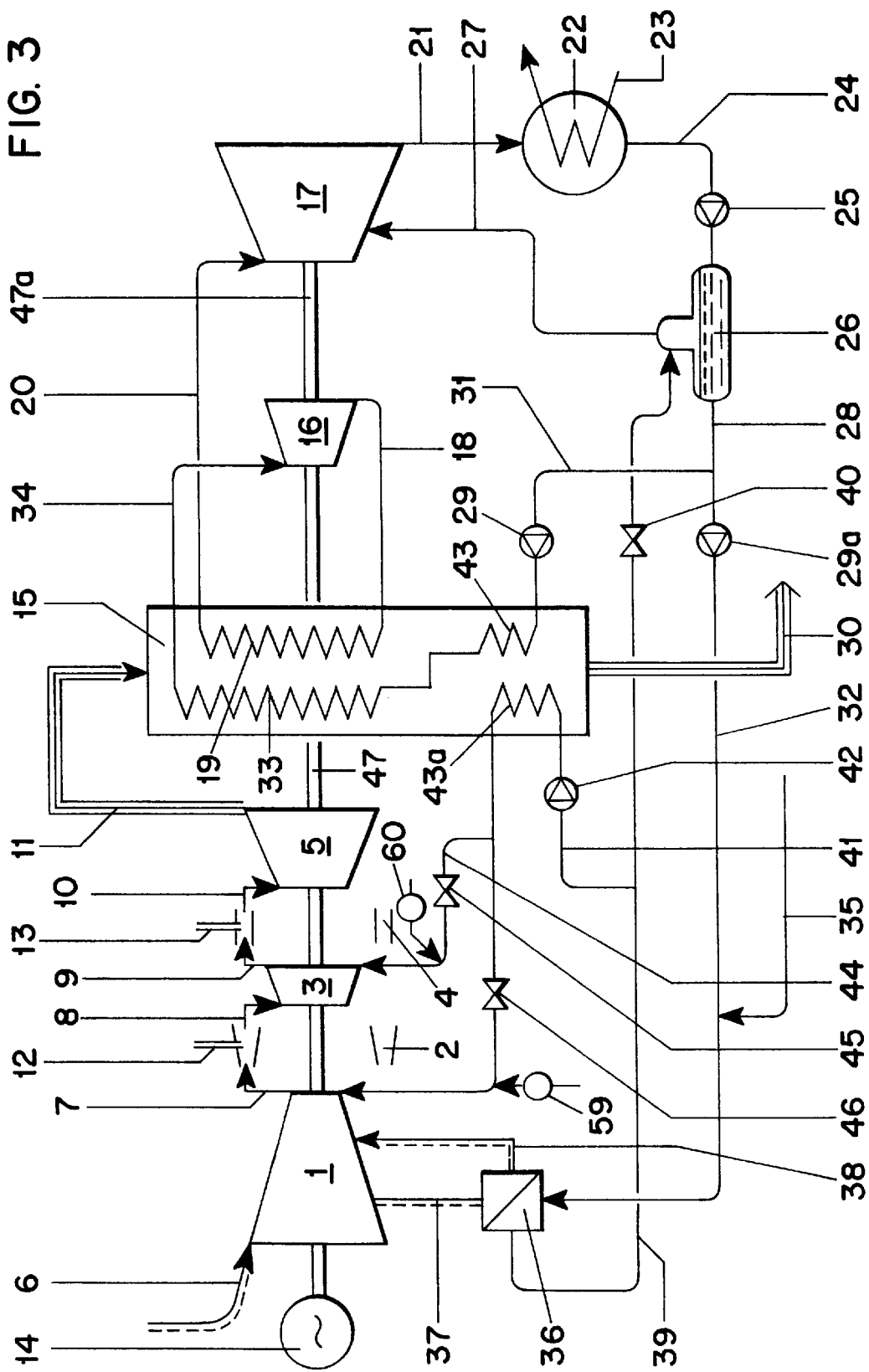
FIG. 3 shows another exemplary embodiment of a power station plant.

FIG. 3 shows the embodiment of FIG. 1 but also providing supply lines for enriching the hot water 3a with a fuel quantity. The supply lines for the fuel are located downstream of each control member 45 and 46. In each supply line an additional control member 59 and 60 is integrated for controlling the flow of fuel into the hot water flow.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method of operating a power station plant including a gas-turbine group, a waste-heat steam generator connected downstream of the gas-turbine group, and a steam circuit connected downstream of the waste-heat steam generator, the gas-turbine group comprising at least one compressor unit having at least one intercooler, at least one combustion chamber, at least one turbine, and at least one generator or a load, the exhaust gases from the last turbine flowing through the waste-heat steam generator, in which the generation of at least one portion of steam is effected for the operation of at least one steam turbine belonging to the steam circuit, comprising:

turning a portion of condensate collected from the last steam turbine into a medium in the intercooler;

introducing the medium into the gas-turbine group; and directing make-up water into the condensate upstream of the intercooler.

2. The method claimed in claim 1, wherein the medium is introduced into the gas-turbine group directly.

3. The method claimed in claim 1, wherein the medium is introduced into the gas-turbine group via a further heating-up means.

4. The method as claimed in claim 1, wherein the medium is hot water.

5. The method as claimed in claim 1, wherein the medium is composed of a hot-water/steam mixture.

6. The method as claimed in claim 1, wherein the medium is introduced upstream of a combustion chamber and/or into said combustion chamber.

7. The method as claimed in claim 1, wherein the medium is enriched with a fuel quantity.

8. The method as claimed in claim 1, wherein the further heating-up of the medium is carried out in an economizer section belonging to the waste-heat steam generator before it is directed into the gas-turbine group.

* * * * *